United States Patent [19] [11] 4,283,244
Hashmi [45] Aug. 11, 1981

[54] METHOD OF MAKING FABRIC-LINED ARTICLES

[75] Inventor: Tas Hashmi, Willard, Ohio

[73] Assignee: Sherwood Medical Industries Inc., St. Louis, Mo.

[21] Appl. No.: 80,858

[22] Filed: Oct. 1, 1979

[51] Int. Cl.³ .............................................. B29B 13/04
[52] U.S. Cl. ......................................... 156/242; 2/164; 2/167; 2/168; 2/169; 156/245; 156/293; 156/294
[58] Field of Search ............... 156/242, 246, 293, 294; 2/16, 158, 159, 164, 167, 168, 169; 264/305, 307

[56] References Cited

U.S. PATENT DOCUMENTS

| | | | |
|---|---|---|---|
| 1,146,638 | 7/1915 | Miller | 156/242 |
| 1,165,198 | 12/1915 | Miller | 156/242 |
| 2,083,684 | 6/1937 | Burke | 2/168 |
| 2,373,529 | 4/1945 | Beal | 156/242 |
| 2,373,940 | 4/1945 | Beall | 2/168 |
| 2,446,921 | 8/1948 | Grant | 2/168 |
| 2,989,755 | 6/1961 | O'Brien et al. | 2/168 |
| 3,072,914 | 1/1963 | Velonis et al. | 2/167 |
| 3,761,965 | 10/1973 | Barasch | 2/167 |
| 3,813,695 | 6/1974 | Podell et al. | 2/168 |
| 3,866,245 | 2/1975 | Sutherland | 2/169 |
| 3,942,193 | 3/1976 | Pugh | 2/167 |

Primary Examiner—Caleb Weston
Attorney, Agent, or Firm—Stanley N. Garber; William R. O'Meara

[57] ABSTRACT

A method of making fabric-lined elastomeric articles of wear is disclosed which includes forming an elastomeric article on a form or mold, applying a pressure-sensitive adhesive to the article while on the form, drying the adhesive, applying a lubricant over the adhesive, positioning a preformed liner over the lubricated adhesive, removing the lubricant, and removing the lined article from the form and turning it inside-out.

23 Claims, 4 Drawing Figures

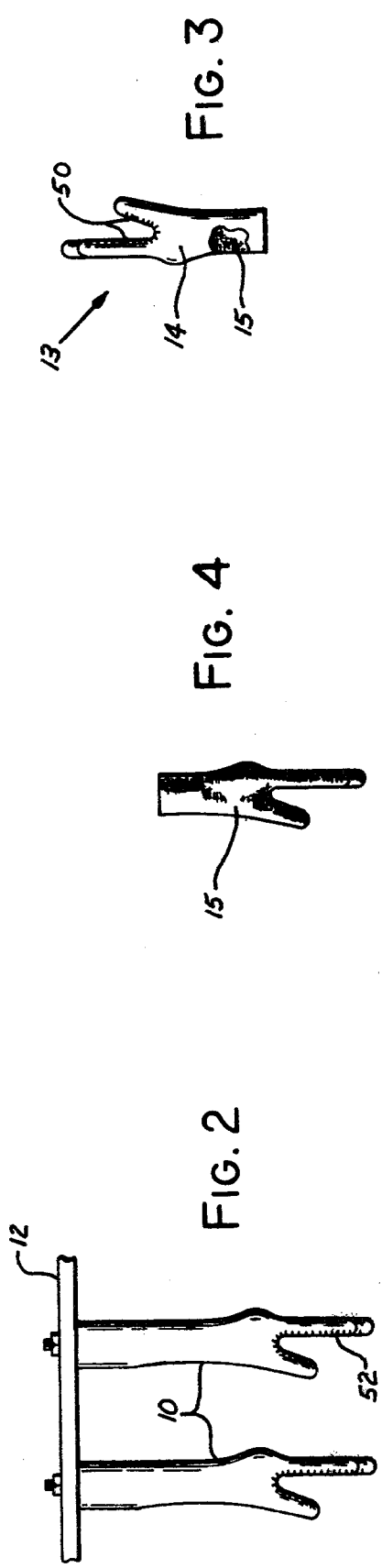
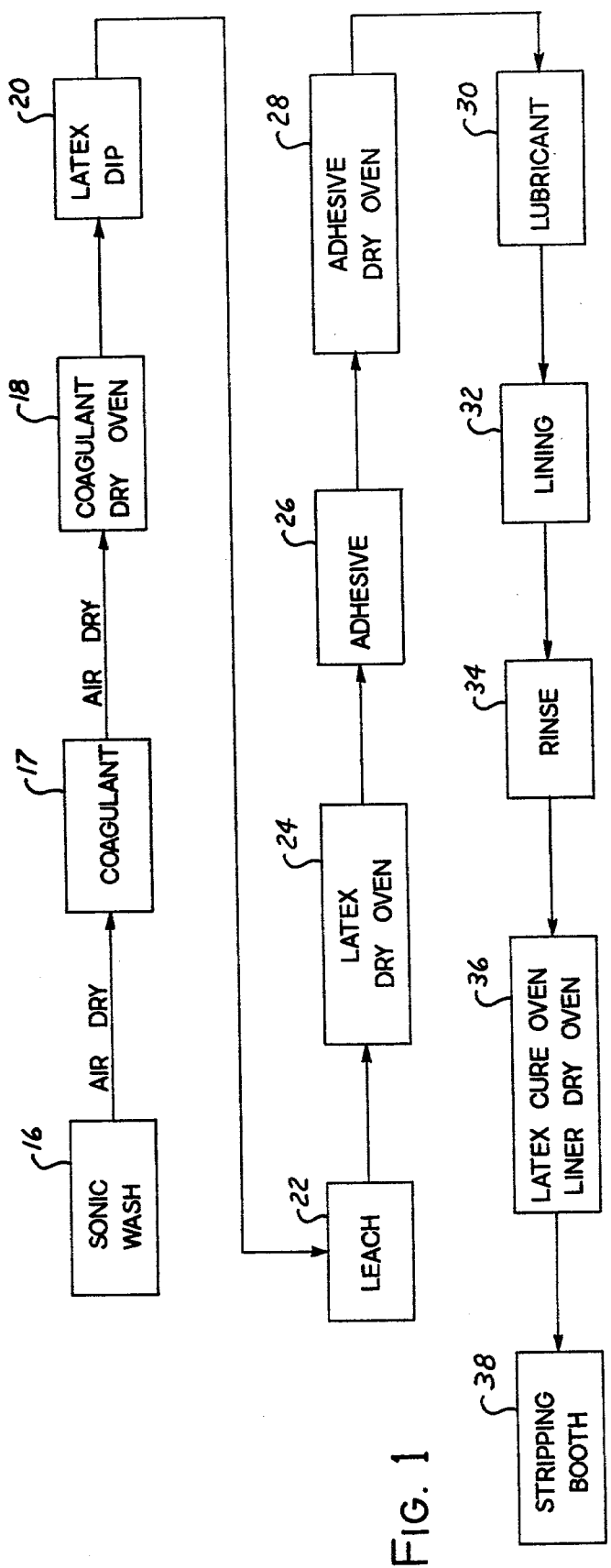
FIG. 3
FIG. 4
FIG. 2
FIG. 1

4,283,244

METHOD OF MAKING FABRIC-LINED ARTICLES

BACKGROUND OF THE INVENTION

This invention relates to a method of making elastomeric articles and more particularly to a method of making lined elastomeric articles of wear.

Lined elastomeric articles, such as fabric-lined elastomeric gloves, are generally made by positioning a fabric preformed liner on a glove form and then forming an elastomeric glove, such as a latex glove, over the liner, such as by the conventional latex dipping process.

Since the latex glove is formed on the liner, the positioning of the liner on the form and the characteristics of the liner are important in determining the quality of the latex layer and, in general, the quality of the finished glove. For example, the weave and yarn of the liner should be of such quality that the latex does not penetrate the liner and contact the form. If the latex does contact the form, the finished glove will have areas where the latex layer contacts the hand of the person wearing the glove, and this, of course, is generally highly undesirable. The liner must be made to relatively stringent dimensional and material requirements since the latex layer is dip-formed over it and it therefore affects the shape of the latex layer. Also, a number of latex dips may be required to form a latex layer over the liner which is thick enough to produce a waterproof glove with a smooth outer surface. In general, the cost of the liner is relatively expensive and constitutes a considerable part of the total cost of the finished fabric-lined glove and the relatively thick latex layer decreases glove flexibility and also increases costs.

Another undesirable feature associated with the manufacture of fabric-lined gloves made by the conventional method of dipping liner-covered forms is that relatively long periods of time are needed for leaching out conventionally used coagulant, such as calcium nitrite, from the liner under the latex layer. Such coagulant, if not removed, could absorb moisture during storage or act as an irritant to the skin. Also, production time and costs are increased by such leaching process steps. Latex gloves have also been made by providing a latex layer on a glove form, applying an adhesive over the latex layer, and applying, such as by blowing, flock onto the adhesive layer to form a lining. The glove is subsequently removed from the form and inverted. One disadvantage of flock lined gloves is that they generally have poor wear characteristics. For example, the flock particles tend to come off the glove and be removed when the hand of the wearer is removed from the glove. Also, the process is relatively expensive, tends to contaminate the atmosphere near the flock applying area during manufacture, and, in general, presents a potential health hazard to the glove manufacturing workers.

SUMMARY OF THE INVENTION

Accordingly, it is an object of the present invention to provide an improved method of making a lined elastomeric article which is especially efficient and economical and wherein the above disadvantages are substantially obviated. Another object is to provide an improved elastomeric article of wear which is economical and of high quality.

In accordance with one aspect of the present invention, an adhesive is applied to the surface of a formed elastomeric article while the article is on a form, a preformed lining is applied over the adhesive, and the article with the lining connected thereto is removed from the form.

These as well as other objects and advantages of the present invention will become apparent from the following detailed description and drawing.

BRIEF DESCRIPTION OF THE DRAWING

FIG. 1 is a block diagram indicating a process of making elastomeric articles in accordance with a preferred embodiment of the present invention;

FIG. 2 is an elevational view of a portion of a dipping form assembly showing a plurality of glove forms used to produce gloves in accordance with the process of the present invention;

FIG. 3 is an elevational view, with parts broken away, of a glove made in accordance with the present invention; and FIG. 4 is an elevational side view of a preformed glove used as the lining in the glove of FIG. 3.

DESCRIPTION OF THE PREFERRED EMBODIMENT

Referring now to the drawing, FIG. 1 is a block diagram illustrating a method of making a lined rubber or elastomeric article, for example, a fabric-lined elastomeric glove or other article of wear, such as rubber footwear, in accordance with a preferred embodiment of the present invention. The process will be described in connection with the method of making seamless, dip-formed fabric-lined elastomeric latex gloves utilizing glove molds or forms 10 illustrated in FIG. 2. While only two glove forms 10 are shown connected to a form conveyor 12, a substantial number of forms are generally associated with each conveyor. A finished glove made by the present process is illustrated in FIG. 3 at 13. Glove 13 includes an outer elastomeric glove body or latex layer or glove 14, and an inner preformed fabric liner 15 adhesively secured to the interior side or surface of the latex glove 14. The fabric liner 15 is shown in FIG. 4 as a fabric or cloth single-piece glove which includes fingers and a palm and is adapted to completely cover the hand.

In making latex articles, such as rubber gloves, the conveyor 12 is moved from station to station during various steps in the process. At the first station 16 in FIG. 1, the forms 10, are subjected to a conventional cleaning step which may include an acid bath and sonic wash. After cleaning, the forms 10 are air-dried and then moved to a station 17 where a suitable or conventional coagulant, such as a conventional calcium nitrate salt solution, is applied to the forms. Generally, the forms are dipped into a tank or container filled with the coagulant. The forms are removed from the coagulant tank and the coagulant dried, for example, they may be moved to a drying oven at station 18 to quickly obtain a dry layer of the coagulant on the form. As is well known, the coagulant causes relatively rapid coagulation of applied latex and prevents the latex from sticking to the form so that the finished gloves can be readily stripped from the forms.

The dry coagulant-coated forms are then dipped, at a station 20, into a container or tank of the desired latex or other elastomeric material which is to form the main bodies of the finished gloves. For example, the elastomeric material may be a typical or conventional latex composition, for example, one commonly used in forming rubber gloves such as a well known natural or synthetic rubber based composition, or it may be a non-latex material such as a conventional polyvinyl chloride compound solution such as a plastisol. An acrylonitrile based latex solution, or other suitable or well known latex or other elastomeric solution conventionally employed in making elastomeric articles may be used. The thickness of the applied latex or elastomeric layer will, of course, depend generally upon the time the forms are in the elastomeric material.

After the latex-coated forms 10 leave the latex dipping station 20, they are partially air dried to effect a latex film on the form and then moved to a conventional coagulant leaching or water wash station 22 for removal of the coagulant or calcium salt. For example, they may be submerged in water for a time sufficient to remove the coagulant, the time submerged being dependent upon the type of latex material and thickness of the layer. The forms are removed from the leaching wash and positioned in a drying oven indicated at station 24 to remove moisture and further partially dry or cure the latex layer. The layers of latex on the forms when removed from the latex drying oven at station 24 are in partially cured or semi-cured condition.

The process steps thus far described are well known in conventional methods of making dip-formed unlined latex gloves or other latex articles, except that the oven at station 24 would generally be a latex curing oven, that is, operated at temperature which would effect full curing of the gloves. If desired, the latex layers or gloves or other articles may be fully cured at station 24 or, as is preferred, fully cured after the liners have been applied as will be discussed herein. Various methods of making elastomeric articles different from the above described method may be used if desired.

In accordance with the present invention, linings or fabric liners 15 are placed over the formed elastomeric or latex articles while the articles are on their forms and the liners are adhesively secured thereto. The article with the adhesively attached liner is subsequently stripped from the form and turned inside-out to produce the finsihed lined article or glove.

In a preferred form of the invention, the glove forms 10 with the uncured or partially cured unlined latex articles thereon are removed from the oven at station 24, and a layer of an adhesive is applied over the articles at a station 26. For example, the forms with partially cured layers of latex are dipped into a tank of a suitable liquid adhesive to provide an adhesive coating covering the outer surface of the latex articles when the forms are removed from the tank. The adhesive-coated forms are then transferred to an adhesive dry oven at a station indicated at 28 to remove moisture from the adhesive and provide an adhesive coating. The forms come from the dry oven at 28 with the adhesive dry and sticky. The adhesive is preferably a pressure sensitive material which is water resistant after drying and remains adhesive in nature for an indefinite length of time. Various well-known pressure sensitive adhesives which lose their outer surface adhesiveness when a liquid lubricant, such as an aqueous soap solution, is applied to them, and which regain their outer surface adhesiveness when the lubricant is removed and the adhesive is dry, may be used in the above described process to bind the preformed lining to the elastomeric layer or glove body. One example of a suitable pressure sensitive adhesive is an adhesive of the resin type manufactured by Evans Adhesives of Colombus, Ohio, identified as product number 68096-01. It has a pH between 4 and 5, a solid content between about 54% and 57%, Brookfield a viscosity between about 300 and 600 cps at 75° F. and the diluent for the adhesive is water. Using this resin material as the adhesive, the forms may be maintained in the adhesive dry oven for example, for about 25 minutes at about 125° F. When the above adhesive is used, the adhesive has an adhesive or sticky outer surface when removed from the dry oven at 28 and does not run off or flow due to gravity. Acrylonitrile based lined latex gloves were made with this adhesive with good results. The adhesive may be, for example, of a type used on transparent plastic tape, such as used on Scotch brand type manufactured by 3M Company of St. Paul, Minn.

The forms, with an adhesive covering the latex films, are then transferred to a liquid lubricant applying station, indicated at 30, where they are dipped or otherwise provided with a suitable lubricant in order to remove the tackiness or adhesiveness from the outer surface of the adhesive-coated forms. This lubricant makes the outer surface of the adhesive-coated forms slick and allows the liners 15 to be readily slipped over the forms. The forms may be dipped at station 30 into a tank of suitable lubricant which is, preferably, an aqueous imulsifier detergent or soap solution. A specific lubricant providing good results is a well known chemical composition known as Aquarex Waq which, is an aqueous solution including sodium alkyl sulfates, and is sold by Du Pont, Elastomers Division, Stow, Ohio. This solution makes the otherwise sticky outer surface of the adhesive very slippery. Other well known lubricants including water and common soaps or detergents that provide an outer surface which is slick enough to permit placement of the liner over the adhesive-coated latex articles may be used. The lubricant removes the tackiness of the adhesive as well as provides a lubricant for sliding the glove onto the form.

The forms are removed from the lubricant dip at station 30 and, with the outer surfaces wet with the lubricant and slick, preformed linings 15 are applied, such as manually, over the adhesive layer at a station 32. The slick lubricant removes the tackiness of the adhesive and provides a lubricant which permits the liners to be readily slipped over and properly positioned snuggly on the adhesive-coated latex articles on the forms. The liners are desirably firmly pulled down toward the wrist portion of the forms with the fingers on the liner registering with those on the form.

Preferably, the liners 15 are made of a suitable fabric such as cotton, dacron or other natural or synthetic materials or yarns, or combinations of materials. Since they are to line a rubber article or glove, they should be somewhat resiliently stretchable or elastic in nature. The liners are generally made to the shape of the finished article on which they are to be placed during manufacture. In case of fabric lined latex gloves, the liner is preferably in the shape of a unitary glove conforming to the inner surface of the desired finished glove but may be of a size requiring some stretching of the fabric in order to slip over the form. The linings may be economically made by automatic knitting machines or other techniques. The lining may be a woven textile or cloth glove.

Next, the lining covered forms are transferred to a rinse station indicated at 34 where the lubricant or soap is removed by rinsing with water, for example, by spraying the forms with water. The force of the spray should generally be in a direction to urge the liner against the form. With the lubricant or soap removed from the adhesive and liner, the forms are placed in a drying and latex cure oven, such as at station 36 to dry the liner and adhesive, and cure the latex. The time the forms are maintained in the cure oven and the oven temperature necessary to cure the latex layer will, of course, depend on such factors as type of latex used and thickness of the latex layer. The adhesive become dry and its adhesiveness returns with the result that the dry liner 15 becomes adhesively connected to the latex layer. While in the oven at station 36, the latex becomes cured and, as the liner dries, it generally tends to shrink slightly against the adhesive layer. Since the lining 15 is resiliently stretched over the form and generally shrinks, the lining adheres tenaciously to the adhesive coating to become secured to the latex layer.

Next, the forms are cooled and transferred to a stripping station indicated at 38. At the stripping station, the cooled liner covered latex articles or gloves are removed from the forms and inverted so that the finished glove, as seen in FIG. 3, has the liner 15 on the inside and the latex layer 14 on the outside. The gloves can be reversed or turned inside out as they are stripped from the forms.

In the manufacture of fabric-lined, butadiene acrylonitrile based latex gloves, for example, the latex dipped glove forms may be placed in the latex dry oven, such as at station 24, for about 30 minutes at about 76° C. to provide a semi-cured latex article. After the forms are dipped into the pressure-sensitive adhesive at station 26, they may be placed in the adhesive dry oven at station 28 for about 25 minutes with an oven temperature at about 52° C. to dry the adhesive. The latex cure and dry oven at station 36 may be operated, for example, between about 113° C. and 143° C.

While the latex articles or gloves may be completely finished or cured articles at the time the adhesive is applied at station 28, it is economically advantageous to apply the liners at a stage when the latex layers on the forms are not in a fully cured state and then to complete the cure in the same oven required to dry the liner-covered forms after they come out of the rinse at station 34.

Since the latex article or glove is formed or shaped on the form independently of the liner, as opposed to forming a latex layer on top of a liner, economical liners can be used and the overall cost of the finished article substantially reduced. For example the weave of the liner need not be as close as in conventional manufacturing methods where liquid latex may penetrate a liner during the latex dipping of a liner-covered form if the liner is not a tight weave. The shape of the liners used in the present process are not as critical as in conventional processes since the latex article is not molded on the liner, and this permits the liner to be made more economically. Also, the elastomeric layer may be economically thin and yet be waterproof and have a smooth outer surface since the outer surface is determined by the outer surface of the form. Fabric-lined waterproof latex gloves having a thickness between about 0.01 inch and 0.015 inch have been successfully made in accordance with the herein disclosed process. If desired, the latex layer, in some cases, may be as thin as 0.002 inch and still provide a waterproof lined glove having a smooth outer surface. In contrast, where the latex layer is formed over a liner on the form, the latex layers are typically between about 0.015 and 0.025 inch so as to obtain a lined waterproof glove having an outer relatively smooth surface.

Since it is not necessary to apply a coagulant, such as a calcium nitrate salt, to the fabric liner in the present process, the relatively long leaching time of the coagulant from the latex-covered liner in conventional processes is avoided. Also, the pressure-sensitive adhesive may be applied at station 26 to an elastomeric article that is on a form or mold and which has been made in any suitable manner.

The finished glove as shown in FIG. 3 has an embossed palm and fingers, the embossing being partially seen at 50. This embossing provides improved gripping friction to reduce slipping between the glove and an article gripped by the person wearing the glove. This embossing may be simply and easily accomplished in the present method by embossing the outer surface of the forms onto which the latex layers are applied in selected areas such as the palm and finger areas. The embossing on the form is partially seen at 52 in FIG. 2. The inner surface of the latex layer conforms to the outer surface of the form and when the finished article is stripped from the form and reversed or turned inside-out, the embossment is on the outer surface of the finished fabric-lined glove to provide the desired friction surface. Thus, with the present method, roughened palm areas on fabric-lined gloves having preformed liners are readily obtained without roughening or coating the palm of the finished glove. This is a savings in time and cost.

As various changes could be made in the above construction and method without departing from the scope of the invention, it is intended that all matter contained in the above description and shown in the accompanying drawing shall be interpreted as illustrative and not in a limiting sense.

What is claimed is:

1. A method of making a lined elastomeric article comprising the steps of applying a coating of adhesive in liquid state to an elastomeric article on a form, drying the adhesive on the article, thereafter applying a preformed lining over the article and the adhesive coating to adhesively connect the lining to the article including the steps of employing a lubricant between the adhesive coating and the inner surface of the lining to facilitate applying the lining over the adhesive coating and article, and thereafter drying the lining and the article on the form, and removing the article with the lining from the form to provide the lined elastomeric article.

2. The method of claim 1 wherein said adhesive is a pressure sensitive adhesive.

3. The method of claim 1 wherein said step of drying the lining and the article on the form includes positioning the form with the article and lining thereon in an oven to dry the article and lining.

4. The method of claim 1 further including the step of removing the lubricant after the lining has been applied.

5. The method of claim 4 wherein the step of removing the lubricant includes the step of washing the form with the lining thereon with a liquid before drying the lining and article on the form.

6. The method of claim 5 wherein the lubricant is an aqueous solution of a soap or detergent.

7. The method of claim 1 wherein the step of removing the article from the form includes inverting it so that the interior side of the article when on the form is the exterior side of the article when removed from the form.

8. The method of claim 1 wherein the lining is a fabric member having a shape similar to that of the article.

9. The method of claim 8 wherein the article is a glove.

10. The method of claim 1 wherein the step of providing the elastomeric article on the form comprises the steps of dipping the form into a container of elastomeric material, and removing the form from the container with a layer of elastomeric material thereon, and at least partially curing the layer on the form before said coating applying step.

11. The method of claim 10 wherein said layer of elastomeric material on the form is only partially cured when said steps of applying the coating of adhesive and of applying the lining are performed, and further including the step of further curing said layer after said steps of applying the coating of adhesive and of applying the lining are performed.

12. The method of claim 4 wherein said adhesive is a liquid resin type pressure sensitive adhesive when the article is coated therewith and when dry has an outer surface which is tacky for an indefinite length of time, said surface when said lubricant is applied thereto loses its tackiness but regains its tackiness when said lubricant is removed and the adhesive surface is dry.

13. The method of claim 5 wherein the elastomeric material is a latex material.

14. The method of claim 13 wherein said latex material is a butadiene acrylonitrile.

15. The method of claim 13 wherein said lining is a singlepiece cloth member.

16. The method of claim 15 wherein the article is a glove, and said lining is a glove.

17. The method of claim 3 wherein the lubricant includes water and a slicking material and is removed from the forms by water.

18. The method of claim 17 wherein the lubricant is removed by spraying water against the liner in a direction to urge the liner against the form prior to positioning the form in said oven.

19. A method of making a fabric-lined glove comprising the steps of forming a latex glove body on a glove form including the step applying a latex coagulant to the surface of a glove form, drying the coagulant on the form, dipping the coagulant coated form into a container of latex to provide a layer of latex thereon, partially drying the latex layer, leaching the coagulant from the form, at least partially curing the layer of latex, thereafter applying a coating of a liquid pressure sensitive adhesive to the outer surface of the latex, drying the adhesive coating, applying a lubricant to the outer surface of the adhesive coating, slipping a fabric liner onto the form into snug contact relation with the lubricated adhesive coating, rinsing the lubricant from the form, drying the liner, removing the latex layer with the liner adhesively connected thereto from the form to provide a latex glove, and turning the latex glove inside out so that the latex layer is on the exterior side and the liner on the interior side of the latex glove.

20. The method of claim 19 wherein said lubricant is an aqueous solution including sodium alkyl sulfate.

21. The method of claim 19 further including the step of placing the form with the latex layer and liner, after said lubricant rinsing step, into an oven to effect said drying of the liner and to further cure the latex layer.

22. The method of claim 19 wherein said glove form has embossments at least on a palm portion thereof to produce embossments on the finished latex glove.

23. The method of claim 20 wherein said lubricant is an aqueous solution including soap or detergent.

* * * * *